United States Patent [19]

Osborn

[11] Patent Number: 4,570,722
[45] Date of Patent: Feb. 18, 1986

[54] FREE FLOATING FOLDABLE TOOL BAR

[75] Inventor: Harley G. Osborn, Zearing, Iowa

[73] Assignee: Gary W. Clem, Inc., Nevada, Iowa

[21] Appl. No.: 568,123

[22] Filed: Jan. 4, 1984

[51] Int. Cl.³ .............................................. A01B 73/00
[52] U.S. Cl. ....................................... 172/311; 172/456
[58] Field of Search ............... 172/311, 446, 456, 662, 172/776; 280/411 R, 411 A

[56] References Cited

U.S. PATENT DOCUMENTS

| | | | |
|---|---|---|---|
| 1,843,275 | 2/1932 | Furrer | 172/586 |
| 3,137,351 | 6/1964 | Bland | 172/624 |
| 3,774,693 | 11/1973 | Orthman | 172/311 |
| 3,828,860 | 8/1974 | Poland | 172/311 |
| 4,031,965 | 6/1977 | Blair | 172/311 |
| 4,171,726 | 10/1979 | Ward | 172/456 |
| 4,178,009 | 12/1979 | Worick | 172/311 |
| 4,178,998 | 12/1979 | Rockwell | 172/311 |
| 4,204,579 | 5/1980 | Rau et al. | 172/657 |
| 4,316,511 | 2/1982 | Andersen | 172/456 X |
| 4,342,367 | 8/1982 | Gates | 172/776 |

OTHER PUBLICATIONS

Orthman Hydraulic Brochure.

Primary Examiner—Richard J. Johnson
Attorney, Agent, or Firm—Henderson & Sturm

[57] ABSTRACT

A folding tool bar apparatus for a farm implement or the like having a horizontally disposed main frame and a pair of wing sections pivotally attached at each end thereof to the main frame. Gauge wheels are attached to each of the wing sections for spacing a wing section a predetermined distance from the ground when the wing section is in use. A rigid link member is pivotally attached to each of the wing sections. Hydraulic cylinders are pivotally attached to the main frame and to the link members. These hydraulic cylinders have a first elongated position which permit the wing members to be in a substantially horizontally extended working position and a second shortened position for causing the wing members to be in a substantially folded transport position. Adequate clearance is provided among the hydraulic cylinders, rigid link members, main frame and wing members for permitting the wing members to pivot upwardly and downwardly from the aforesaid horizontally disposed main frame when the hydraulic cylinders are in the extended position thereof for allowing the wing members to pivot upwardly and downwardly from the horizontal position to accommodate unevenness in the ground being traversed by the respective wing section.

1 Claim, 7 Drawing Figures

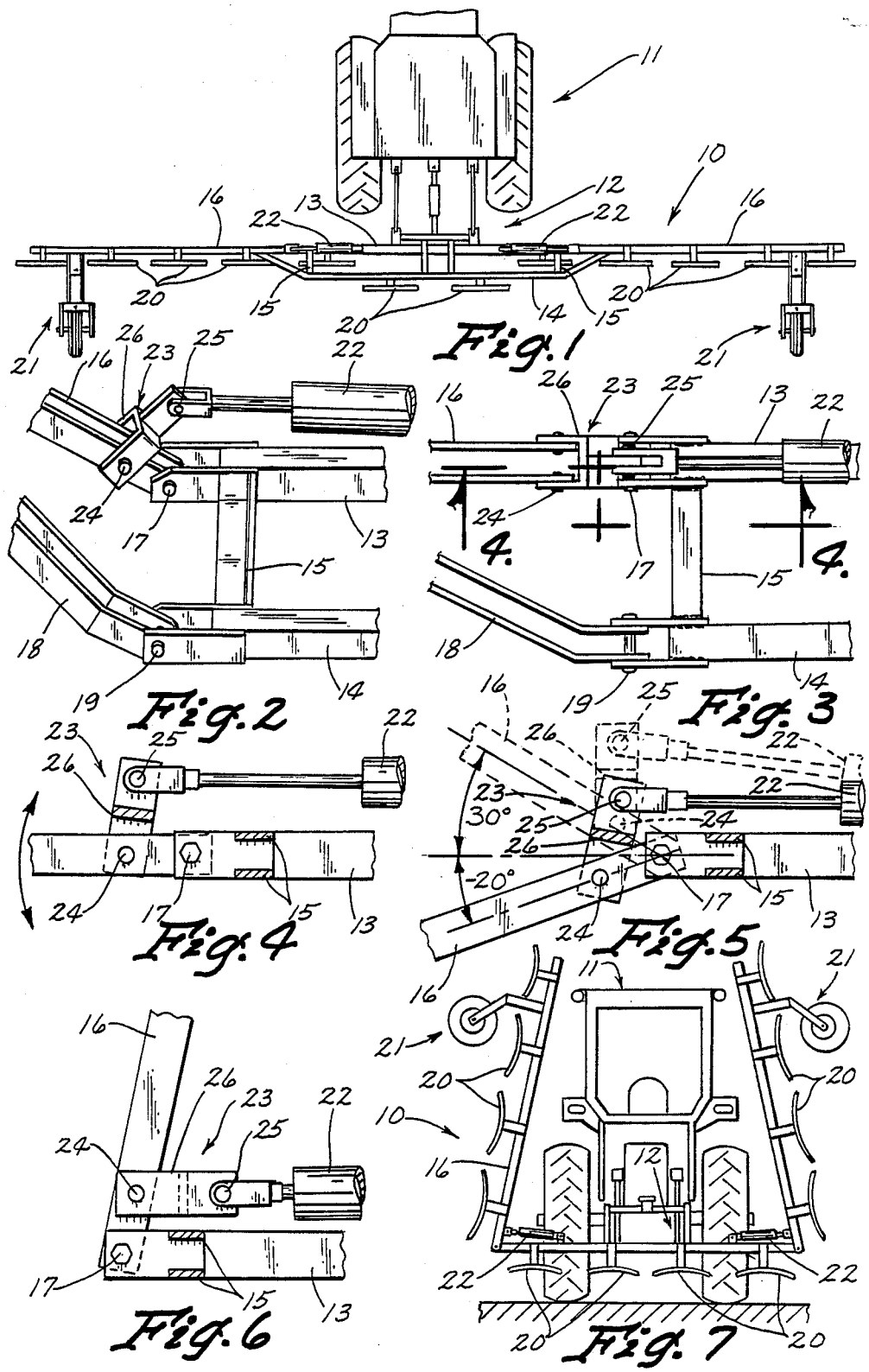

FREE FLOATING FOLDABLE TOOL BAR

TECHNICAL FIELD

The present invention relates generally to folding tool bars, and more particularly to a hydraulically controlled folding tool bar having a mechanism thereon for permitting a wing section of the tool bar apparatus to pivot upwardly and downwardly with respect to the main section thereof and for the purpose of maintaining such wing sections as parallel to the ground being traversed as possible.

BACKGROUND ART

With the advent of very large tractors with a high horsepower range, it has become common to use very long tool bars having earth working tools attached thereto at spaced intervals along such tool bar. Likewise, other crop treating devices, such as sprayers are attached to such long tool bars.

Because such tool bars are so long, it becomes necessary to fold such tool bars when it is desired to transport the device between the field in which it is being used and the place where it is to be stored, which necessitates movement through narrow gates and along public roads. For this reason, there have been numerous inventions relating to structures for folding such long tool bars in one way or another.

These very long tool bars which fold work just fine on level ground, but do not work satisfactorily on uneven ground because they tend to be designed to be rigid and straight when folded into a position for use in the field. That is to say, if the ground is uneven, then one part of the tool bar will be closer to the ground than another, thereby causing uneven working of the ground or, in the case of spraying equipment, causing the spraying operation to be uneven and therefore unsatisfactory.

There have been certain attempts to permit some flexing or variation of the wing sections of a folding tool bar with respect to the ground. The problem is that previous attempts to permit the wing sections of the tool bar to pivot up and down to conform to the variations in the level of the ground have been too complex and consequently expensive to produce and somewhat unreliable because of having too many moving parts.

Consequently, there is a need for an uncomplicated, reliable solution to the aforementioned problem.

DISCLOSURE OF THE INVENTION

The present invention relates to a folding tool bar apparatus for a farm implement or the like having a horizontally disposed main frame and a pair of wing sections pivotally attached at each end thereof to the main frame. Gauge wheels are attached to each of the wing sections for spacing a wing section a predetermined distance from the ground when the wing section is in use. A rigid link member is pivotally attached to each of the wing sections. A first hydraulic cylinder is pivotally attached to the main frame and is also pivotally attached to one of the link members. Another hydraulic cylinder is attached to the main frame and is pivotally attached to the other of the rigid link members. These hydraulic cylinders have a first elongated position which permit the wing members to be in a substantially horizontally extended working position and these hydraulic cylinders have a second shortened position for causing the wing members to be in a substantially folded transport position.

Adequate clearance is provided among the hydraulic cylinders, rigid link members, main frame and wing members for permitting the wing members to pivot upwardly and downwardly from the aforesaid horizontally disposed main frame when the hydraulic cylinders are in the extended position thereof. This allows the wing members to pivot upwardly and downwardly from the horizontal position to accommodate unevenness in the ground being traversed by the respective wing section. A stop structure is disposed on the wing members for preventing the wing sections from pivoting beyond a first predetermined amount upwardly and a second predetermined amount downwardly.

An object of the present invention is to provide an improved folding tool bar.

Another object of the invention is to provide an uncomplicated, reliable structure for permitting a folding tool bar wing section to pivot upwardly or downwardly for the purpose of remaining substantially parallel to the ground being traversed by such wing section.

A further object of the present invention is to provide a folding tool bar structure of the aforementioned type which is economical to produce and reliable to use.

Other objects, advantages and novel features of the present invention will become apparent from the following detailed description of the invention when considered in conjunction with the accompanying drawings.

BRIEF DESCRIPTION OF THE DRAWINGS

FIG. 1 shows the present invention attached to an agricultural tractor and having banding sprayer units attached thereto;

FIG. 2 is an enlarged perspective view of the present invention in an intermediate position thereof;

FIG. 3 is a top view of the apparatus shown in FIG. 2, but having the hydraulic cylinder extended to position the wing member in a first working position thereof, as also shown in FIG. 1;

FIG. 4 is a cross-sectional view taken along line 4—4 of FIG. 3;

FIG. 5 is a view like FIG. 4, but showing in dashed lines how the wing section can pivot downwardly by a total of 20° from the horizontal and can pivot upwardly by 30° from the horizontal;

FIG. 6 is a view like FIG. 4, but showing the hydraulic cylinder and a second shortened position thereof for moving the wing section in a substantially folded transport position; and FIG. 7 is a rear view of the apparatus shown in FIG. 1, but showing the wing section folded to a transport position and having the hydraulic cylinder shortened to the position shown in FIG. 6.

BEST MODE FOR CARRYING OUT THE INVENTION

Referring now to the drawings wherein like reference numerals designate identical or corresponding parts throughout the several views, FIG. 1 shows the present invention (10) attached to an agricultural tractor (11) by means of a three-point hitch (12).

Referring to FIG. 2, it is noted that a main frame (13) of the tool bar structure (10) has an extra parallel portion (14) attached thereto by braces (15). A pair of wing sections (16) are pivotally attached to the main frame (13) by a pin (17). A brace (18) is also welded at one end thereof to the wing section (16) and is pivotally attached by pin (19) at the other end thereof to the brace element (14). A plurality of banding sprayer units (20) are attached at spaced intervals along the wing sections (16), main frame (13) and brace element (14). Gauge wheels (21) are also attached to each of the wing sections (16) for selectively adjusting the distance that the end of the wing sections (16) will be disposed above ground being traversed.

A pair of hydraulic cylinders (22) are pivotally attached on one end thereof to the main frame (13). A link member (23) is pivotally attached at one end thereof by a pin (24) to the wing section (16) and is pivotally attached at the other end thereof by a pin (25) to the other end of the hydraulic cylinder (22). An intermediate portion (26) of the link member (23) serves as a stop for movement of the wing sections, as will be discussed below.

In operation, the operator of the banding sprayer apparatus (10) shown in FIG. 1 would first move the hydraulic controls (not shown) of hydraulic cylinders (22) so as to shorten them to the position shown in FIGS. 6 and 7, whereby the wing sections (16) will be folded upwardly and such operator can then drive the agricultural tractor (11) with the present invention (10) attached thereto to the field for use. Once such apparatus is in the field, then the controls (not shown) for hydraulic cylinders (22) are moved to cause the hydraulic cylinders (22) to be extended to the position shown in FIGS. 1, 3 and 4, whereby a very large area of crops can be sprayed with the banding sprayer units (20) attached thereto.

If the tractor (11) is traversing uneven ground and the level of the ground over which the wing sections (16) on the left side is traversing lower than the level of the ground under main frame (13), then the leftmost wing (16) can pivot downwardly to whatever level is necessary in order for the wing section (16) to be substantially parallel with the ground thereunder being traversed. FIG. 5, for example, shows that the wing section (16) can pivot downwardly to a predetermined amount, for example 20° from the aligned position with the main frame (13).

A stop structure (26) is provided on the wing (16) for preventing the wing section from going too far downwardly, to prevent the wing section (16) from getting stuck in an erosion ditch or the like. Also, if it should happen that the ground on the left side over which the left side wing section (16) is traversing is higher than the level that the main frame (13) is traversing, then the left wing section (16) will be pushed upwardly by the force of gauge wheel (21) and thereby tend to remain substantially parallel to the ground being traversed thereby. Of course, the action of the wing section (16) on the right side would be substantially like the action of the wing section (16) on the left side; i.e., it will tend to move upwardly or downwardly automatically depending upon whether the ground over which the gauge wheel (21) is passing is higher or lower than the ground over which the main frame (13) is traversing.

Accordingly, it will be readily appreciated to those skilled in this art that the aforementioned objects are achieved by use of the best mode disclosed above. Obviously, many modifications and variations of the present invention are possible in light of the above teachings. It is therefore to be understood that, within the scope of the appended claims, the invention may be practiced otherwise than as specifically described.

I claim:

1. A folding tool bar apparatus for a farm implement or the like comprising:

a horizontal disposed main frame;

a wing section pivotally attached to one end of said main frame along a first horizontal axis;

gauge wheel means attached to said wing section for spacing said wing section a predetermined distance above the ground beneath it;

a rigid link member pivotally attached to said wing section along a second horizontal axis, said link member having two downwardly depending legs, and a connecting stop structure, said second horizontal axis extending through said wing section and through said downwardly depending legs;

a hydraulic cylinder;

means for pivtally attaching said hydraulic cylinder to said main frame;

means for pivotally attaching said link member along a third horizontal axis to said hydraulic cylinder so that said third horizontal axis is held in a fixed location with respect to said rigid link member;

said hydraulic cylinder having a first elongated position for permitting said wing member to be in a substantially horizontally extended working position and a second shortened position for causing said wing member to be in a substantially folded transport position;

said first, second and third horizontal axes being parallel with respect to each other;

means for permitting adequate clearance among said hydraulic cylinder, link member, main frame and wing member for permitting said wing member to pivot upwardly and downwardly from said horizontally disposed main frame when said hydraulic cylinder is in the first extended position thereof depending upon the contour of the land below the wing section; and said stop structure being disposed on said link member for preventing said wing section from pivoting beyond a predetermined amount downwardly, said stop structure having a first end surface for abutment with a first surface on said wing section to limit the downward movement of said wing member and a second end surface on said stop structure spaced from a second surface on said wing section to permit upward limited movement of the wing section without adjusting the length of the hydraulic cylinder.

* * * * *